United States Patent Office 3,055,949
Patented Sept. 25, 1962

3,055,949
PREPARATION OF HYDROQUINONE AND QUINHYDRONE FROM ACETYLENE AND CARBON MONOXIDE
Benjamin W. Howk, West Chester, Pa., and John C. Sauer, Wilmington, Del., assignors to E. I. du Pont de Nemours and Company, Wilmington, Del., a corporation of Delaware
No Drawing. Filed Aug. 14, 1958, Ser. No. 754,913
14 Claims. (Cl. 260—621)

This invention relates to a new and improved method for preparing quinonoid compounds. More particularly this invention relates to a new catalytic process for preparing quinonoid compounds, especially hydroquinone and quinhydrone.

Hydroquinone occurs in certain plants as a glycoside, from which it is liberated by hydrolysis. The commercial method of preparation is reduction of quinone, obtained by oxidation of aniline, which in turn is prepared from benzene either by nitration and reduction or by chlorination followed by amination. In this method, there are six separate and distinct operations, starting from the parent aromatic hydrocarbon.

Quinhydrone is obtained when a solution of quinone in an alcohol is added to a solution of hydroquinone in the same solvent. Since both hydroquinone and quinhydrone have the same immediate precursor, quinone, for which there is no simple synthesis, it is clear that cost-wise neither can become a low cost chemical unless economies can be effected either through reduction in process steps, employment of cheaper starting materials than benzene, or a combination of these.

This application is a continuation-in-part of our copending patent application Serial No. 516,332, filed June 17, 1955, and now abandoned.

It is an object of this invention to provide a new and improved method for preparing quinonoid compounds. A further object is to provide a new catalytic process for preparing quinonoid compounds, particularly hydroquinone and quinhydrone. A still further object is to provide an improved process for preparing quinonoid compounds from acetylene and carbon monoxide. Another object is to provide a new and improved process for preparing hydroquinone or quinhydrone in a one-step operation from acetylene and carbon monoxide. Other objects will appear hereinafter.

These and other objects of this invention are accomplished by providing the following process for preparing quinonoid compounds which comprises reacting, in the presence of a liquid reaction medium, acetylene with carbon monoxide in contact with a catalytic amount of a halide, a carbonyl or the acetylacetonate of ruthenium or rhodium.

According to this invention, hydroquinone and quinhydrone are obtained by reacting, in a liquid reaction medium, acetylene with carbon monoxide in the presence of a catalytic amount of a halide, carbonyl, or the acetylacetonate of ruthenium or rhodium.

In practice a pressure reactor is charged with a liquid reaction medium or solvent, such as a hydroxylic compound, i.e., water or an alcohol, or a ketonic compound, such as acetone, or an ether, such as dioxane, and the catalyst, the reactor is closed, cooled to 0° C. or lower, and evacuated. A predetermined metered amount of acetylene is added, and the charged reactor is placed in a heated shaker box. Carbon monoxide is then introduced to provide at least one mole thereof per mole of acetylene and the charge is agitated and heated at 85° C. to 200° C. until there is no further reaction, as evidenced by cessation of pressure drop. Throughout the reaction period the pressure within the reactor is maintained in the range of 50 to 3000 atmospheres by periodic injections of carbon monoxide. After reaction is complete, the reactor is permitted to cool, unreacted acetylene and carbon monoxide are vented to the atmosphere, and the reactor discharged.

The reaction mixture is extracted with ether, or other suitable solvent, dried, filtered, and distilled to remove the solvent. The hydroquinone or quinhydrone in the non-volatile residue may be isolated either by sublimation or by extraction with aqueous alkali or with an organic solvent, followed by precipitation.

The examples which follow are submitted to illustrate and not to limit this invention. The ruthenium and rhodium halides employed are the hydrated commercial products, and the reactor used of 400 ml. capacity.

*Example I*

Into a pressure reactor there was charged 100 ml. of methanol and 1 g. of diruthenium nonacarbonyl. The reactor was closed, cooled in solid carbon dioxide/acetone, and evacuated. Acetylene, to the extent of one mole (26 g.), was metered into the cold reactor. Carbon monoxide was then pressured into this vessel at 835–980 atmospheres, during a period of 16.5 hours, while the reactor was maintained at 100°–150° C. The reactor was then cooled to room temperature and opened.

The reaction mixture was removed from the vessel and distilled at a pressure of 30–60 mm. and a bath temperature of 30–50° C. until the methanol had all been removed. The extremely viscous tarry residue remaining in the still pot was given a very crude distillation, the distillate boiling at 82–132° C./2 mm. In an attempt to purify this distillate by a more careful distillation, 5.3 g. of a liquid distilling from 53–150° C./5 mm. was collected. At this point, much solid sublimate was noted not only in this distillate but in the condenser of the still. Seven grams of the solid sublimate was scraped out of the condenser of the still. Recrystallization of the sublimate from ethyl acetate containing a small amount of petroleum ether gave beautiful crystals melting at 175–177° C. (5 g.). Infrared analysis confirmed that this compound was hydroquinone (9% conversion).

*Example II*

A run similar to that described in Example I was made from a charge consisting of 100 ml. of methanol, 2.5 g. of diruthenium nonacarbonyl, and 26 g. of acetylene. Carbon monoxide was injected so that at 137°–146° C. the total pressure within the reactor was 750–950 atmospheres. These conditions were maintained for 17 hours. The product thus obtained was composited with a run of identical charge carried out at 144°–147° C. and 890–970 atmospheres total pressure for 15.3 hours.

The non-volatile residue from these combined runs weighed 87 g. This residue was first steam distilled, the residual matter in the still pot was extracted once with benzene and then six times with ether. The ether was driven off of the ether extract, and from the residual crystalline mush there was obtained 8 g. of hydroquinone by recrystallization from hot water. Infrared analysis confirmed that the recrystallized compound was hydroquinone There was also obtained a 9.5 g. fraction which, by infrared analysis, was shown to be chiefly hydroquinone with an impurity absorbing at 5.8 microns.

*Example III*

A run similar to that described in Example I was made from a charge consisting of 100 ml. of water, 2.0 g. of diruthneium nonacarbonyl, and 26 g. of acetylene. This run was carried out at 124°–125° C. and 890–960 atmospheres pressure of carbon monoxide during 16.5 hours. The reaction mixture was acidified with 2 ml. of 50% sulfuric acid and extracted four times with ether. The ether was removed by distillation. The residual crystalline mush remaining in the still pot weighed 10 g. A small portion of this crystalline material sublimed very readily, leaving virtually no residue, giving crystals melting at 148–155° C. The crystalline material was recrystallized from an ethyl acetate/petroleum ether solvent to give 6 g. of a product melting at 168–172° C. Infrared analysis showed this product to be hydroquinone, its absorption spectrum being identical with that of an authentic sample of hydroquinone.

*Example IV*

A run similar to that described in Example I was made from a charge consisting of 125 ml. of acetone, 2.0 g. of diruthenium nonacarbonyl, and 26 g. of acetylene. This run was carried out at 124°–127° C. and 900–960 atmospheres pressure of carbon monoxide during 16.3 hours. The non-volatile residue from this run weighed 6.2 g. A small portion of this residue was sublimed at 1 mm. in a vapor bath at 200° C. Nearly all of this residue sublimed, giving crystals melting at 169°–170° C. Recrystallization of the sublimate from an ethyl acetate/petroleum ether solvent gave green crystals melting at 168°–170° C. The product was characterized as quinhydrone by infrared analysis, its absorption spectrum being identical with that of an authentic sample of quinhydrone.

*Example V*

Example I was repeated, employing a charge consisting of 100 ml. of dioxane, 2 g. of diruthenium nonacarbonyl, and 26 g. of acetylene. Carbon monoxide was injected so that at 120°–134° C. the total pressure was in the range of 800–1000 atmospheres. This pressure was maintained during 15.7 hours, after which time the contents of the reactor were discharged, concentrated at 20–40 mm. pressure on a water bath, and the solid residue extracted with ethyl acetate. By precipitation with petroleum ether, 7.6 g. of crude quinhydrone was obtained. Recrystalliaztion of a portion of the crude product from ethyl acetate gave dark green crystals melting at 156°–160° C. Infrared analysis indicated that this material was quinhydrone of high purity.

*Example VI*

Following the procedure of Example I the reactor was charged with 100 ml. of isopropyl alcohol, 0.8 gram of ruthenium chloride, and 26 g. of acetylene and the charge heated at 127–181° C. under 480–1000 atmospheres carbon monoxide pressure for 16 hours. After removing low boiling material by distillation there was obtained by sublimation 6 g. of a product melting at 170–1° after recrystallization from methanol, which infrared analysis confirmed to be hydroquinone.

*Example VII*

Following the procedure of Example I a charge consisting of 95 g. of acetonitrile, 5 g. of methanol, 0.8 g. of ruthenium chloride, and 26 g. of acetylene was placed in the reactor and heated at 113–116° C. and 930–1000 atmospheres carbon monoxide pressure for 16.5 hours. After removing the acetonitrile and methanol by distillation the residue solidified and, following a recrystallization from methanol, the residue (2.1 g.) melted at 130–148° C. Infrared analysis indicated this material to be hydroquinone, although the melting point would indicate a slight amount of impurity to be present.

*Example VIII*

Following the procedure of Example I a charge consisting of 100 ml. of water, 0.8 g. of rhodium chloride, and 26 g. of acetylene was placed in the reactor and heated at 145–195° C. under 400–950 atmospheres carbon monoxide pressure for 10 hours. From the reaction mixture there was obtained, by sublimation, a total of 9 g. of a product melting at 171–2° C., whose structure was confirmed by infrared analysis to be hydroquinone.

*Example IX*

The above experiment was repeated with a charge consisting of 100 ml. of distilled water, 1.0 g. of rhodium chloride, 1.5 ml. of pyridine, and 26 g. of acetylene. The charge was heated at 140–250° C. under 525–1000 atmospheres carbon monoxide pressure for 17.2 hours. From the reaction mixture there was obtained 5 g. of a material which readily sublimed. This material after recrystallization from methanol melted at 158–164° C. and its infrared spectrum confirmed that it was hydroquinone. The low melting point indicates the presence of impurities in the product.

*Example X*

The procedure of Example I was followed with a charge consisting of 100 ml. of water, 25 ml. of isopropyl alcohol, 0.5 g. of rhodium acetylacetonate, and 10 g. of acetylene. The charge was heated at 140–213° C. under 555–920 atmospheres carbon monoxide pressure for 16.6 hours. The crude reaction mixture was extracted twice with ether, the ether layer dried over anhydrous magnesium sulfate, and distilled. Near the conclusion of the distillation, a sublimate began to appear in the upper portion of the still. The sublimate was removed with warm acetone, the acetone removed by evaporation, and the residue recrystallized from methanol. There was thus obtained 6 g. of hydroquinone whose structure was confirmed by the infrared analysis.

*Example XI*

In accord with the procedure of Example I the reactor was charged with 100 ml. of distilled water, 20 ml. of isopropyl alcohol, 26 g. of acetylene, and 0.3 g. of rhodium dicarbonyl chloride [Rh(CO)$_2$Cl]$_2$, prepared as described subsequently. The charged reactor was heated at 145°–200° C. under 690–950 atmospheres carbon monoxide pressure for 14.8 hours. The mixture was extracted twice with ether, the ether extract dried over anhydrous magnesium sulfate, and concentrated at 20–40 ml. pressure. The residue remaining in the distillation vessel was a slushy solid (36 g.). The infrared spectrum of this material indicated that it was a mixture of hydroquinone and carbonyl group containing material. Filtration of the slush gave 12 g. of hydroquinone, the structure of which was confirmed by infrared analysis. The oily filtrate was distilled, and by sublimation there was obtained another 6 g. of hydroquinone, characterized by its infrared spectrum. This represents a total of 18 g. of hydroquinone (33% yield), based on acetylene charged into the reactor. Another 4 g. of an oily residue from the sublimation is believed to be mainly hydroquinone judged by its infrared spectrum.

The rhodium dicarbonyl chloride was prepared as follows:

A mixture of 13.2 g. of rhodium trichloride trihydrate, RhCl$_3$·3H$_2$O, 6.4 g. of copper powder, and 120 ml. of n-hexane was heated in a silver-lined pressure reactor under 250 atmospheres of carbon monoxide at 160° C. for 15.5 hours. During this time there was a slow, gradual pressure drop of 25 atmospheres. The reactor was opened and discharged under nitrogen. The reaction mixture was heated to boiling and pressure-filtered. The solid on the filter was washed three times with ice-cold hexane. The solid which crystallized was separated by filtration, washed with the ice-cold n-hexane, and dried in a stream of nitrogen. There was obtained 5.2 g. of dark red needles which melted sharply at 128° C. The literature (W. Hieber et al., Z. anorg. Chem. 251, 96 (1943)) M.P. of rhodium dicarbonyl chloride is 123° C.

*Example XII*

The procedure of Example I was followed with a charge consisting of 100 ml. of water, 20 ml. of isopropyl alcohol, 26 g. of acetylene, and 1.0 g. of a rhodium carbonyl, prepared by injecting carbon monoxide into rhodium powder suspended in n-hexane in the presence of hydrogen. The reaction charge of water, isopropyl alcohol, acetylene, and catalyst was heated at 179–182° C. under 770–950 atmospheres carbon monoxide pressure for 15 hours. From the crude reaction mixture there was obtained 3 g. of a sublimate whose structure was shown to be hydroquinone by infrared analysis.

The rhodium carbonyl used in the above experiment was made as follows:

A pressure reactor was charged with 12 g. of rhodium powder and 100 ml. of n-hexane. After cooling and evacuating, hydrogen to 500 lb./sq. in. was added and carbon monoxide was injected so that at 179° to 182° C. the pressure was 770 to 950 atm. These conditions were maintained for 15 hrs. Thereafter the reactor was allowed to cool, opened, and the contents discharged and stored.

*Example XIII*

In accord with the procedure of Example I a charge consisting of 100 ml. of water, 20 ml. of isopropyl alcohol, 0.4 g. of rhodium chloride, and 26 g. of acetylene was placed in the reactor and heater at 80–104° C. under 210–300 atmospheres' carbon monoxide pressure for 15.6 hours. The product from this experiment was combined with that from an almost identical run. The composite was extracted three times with ether, the ether extract dried over anhydrous magnesium sulfate, and the ether then removed by distillation. The residual liquid was dissolved in about 100 ml. of ether, and about an equal amount of benzene was added gradually as the ether was distilled off. Upon cooling, there was obtained a considerable slurry of crystalline material suspended in the benzene. This precipitate was filtered, washed once with benzene, and distilled. There was thus obtained 28 g. of a product identified by infrared analysis as hydroquinone.

*Example XIV*

Using the procedure described in the above example a pressure reactor was charged with 100 ml. of distilled water, 25 ml. of isopropyl alcohol, 0.5 g. of the ruthenium chelate of acetylacetone, and 15 g. of acetylene. The charge was heated at 174–178° C. under 775–950 atmospheres carbon monoxide pressure for 15.8 hours. From the reaction mixture there was obtained 6 g. of hydroquinone by sublimation, characterized by its infrared spectrum.

The reaction between the acetylene and carbon monoxide is carried out in the presence of a reaction medium. Suitable liquid reaction media for effecting the preparation of hydroquinone and quinhydrone, in accord with this invention, besides those illustrated in the examples, are alcohols, such as alkanols and cycloalkanols, e.g., ethanol, propanol, cyclohexanol, and the like; ketones, such as, methyl ethyl ketone, diethyl ketone and other dialkyl ketones, methyl cyclohexyl ketone, and the like; and ethers, such as diethyl and dipropyl ether, tetrahydrofurane, and the like. The preferred alcohol, ketone, and ether reaction media are aliphatic and cycloaliphatic alcohols, ketones, and ethers which other than the respective hydroxyl, ketonic, and ether oxygen groups are entirely saturated aliphatic or cycloaliphatic hydrocarbon.

The amount of liquid reaction medium is not critical, but generally it is between 2 and 10 times the amount of acetylene charged into the reactor.

The hydroquinone results from reacting acetylene with carbon monoxide in 1:1 mole ratio. In the reaction there are actually involved 2 moles of acetylene with 2 moles of carbon monoxide with abstraction of one mole of hydrogen, probably from the reaction medium. In practice, a metered amount of acetylene is added to the reactor and then carbon monoxide is injected to provide at least one mole per mole of acetylene charged. Employing a 400 ml. reactor and 20 to 30 g. of acetylene the amount of carbon monoxide injected is that which will provide a total pressure at reaction temperature in the range of 50 to 3000 atmospheres, preferably between 700 and 1500 atmospheres.

The process is carried out at temperatures of 85° to 200° C. and preferably between 100° and 175° C.

The nature of the reaction by which quinhydrone is formed is not known but it is believed that it involves reaction of quinone, first formed from 2 moles of carbon monoxide and 2 moles of acetylene with hydroquinone resulting from reduction of quinone by hydrogen, probably originating in the reaction medium.

The reaction is conducted until there is no further pressure drop. This generally requires from 2 to 16 hours. Throughout the reaction period the pressure within the reactor is maintained by periodic injections of carbon monoxide.

The reaction is conducted in the presence of a halide, carbonyl, or the acetylacetonate of ruthenium or rhodium. Usually the amount of halide, carbonyl, or the acetylacetonate of ruthenium or rhodium will be between 1 and 15% by weight of the acetylene charged into the reactor.

Illustrative halides, carbonyls, and the acetylacetonate of ruthenium and rhodium operable in the process of this invention include ruthenium dichloride, trichloride, and tetrachloride; ruthenium triiodide, rhodium trichloride, and tetrachloride; diruthenium nonacarbonyl, monoruthenium pentacarbonyl, ruthenium dicarbonyl diiodide, rhodium tetracarbonyl, $[Rh(CO)_4]_2$ and $[Rh(CO)_4]_x$; rhodium tetracarbonyl hydride, rhodium dicarbonyl chloride, ruthenium acetylacetonate, rhodium acetylacetonate, and the like. The preferred halides are the chlorides and bromides.

The halides of ruthenium and rhodium may be used alone or modified with aryl derivatives of group V–A elements, i.e., arsenic, phosphorus, antimony, nitrogen, and bismuth, particularly with triaryl derivatives of phosphorus and antimony, e.g., triphenylphosphine, triphenylarsine, and triphenylstibine.

Commercial acetylene containing less than 20 p.p.m. of oxygen and treated with alumina and caustic pellets to remove impurities such as acetone, water, or phosphines is used.

The process of this invention is a marked improvement over previously known methods for preparing hydroquinone and quinhydrone in being truly catalytic, giving improved yields of desired products, and in being a one-step operation based on cheap, abundantly available acetylene and carbon monoxide.

Hydroquinone and quinhydrone are useful as reducing agents. The following example illustrates the use of hydroquinone as a reducing agent.

A 0.20 g. sample of silver nitrate was placed in 5 ml. of water. To the resulting solution there was then added 0.05 g. of hydroquinone. A silver mirror formed immediately on the walls of the container.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Process for preparing quinonoid compounds of the class consisting of hydroquinone and quinhydrone which comprises reacting, in a liquid reaction medium, a acetylene with carbon monoxide in contact with a catalytic amount of a compound selected from the class consisting of halides, carbonyls, and acetyl acetonates of ruthenium and of rhodium.

2. Process for preparing quinonoid compounds of the class consisting of hydroquinone and quinhydrone which comprises reacting, in a liquid reaction medium, at a temperature of 85 to 200° C., under a pressure of 50 to 3000 atmospheres, acetylene with carbon monoxide in contact with a catalytic amount of a compound selected from the class consisting of halides, carbonyls and acetyl acetonates of ruthenium and of rhodium.

3. Process for preparing quinonoid compounds of the class consisting of hydroquinone and quinhydrone which comprises reacting, in a liquid reaction medium, at a temperature of 85 to 200° C., under a pressure of 50 to 3000 atmospheres, acetylene with carbon monoxide in contact with a catalytic amount of a ruthenium carbonyl.

4. Process for preparing quinonoid compounds of the class consisting of hydroquinone and quinhydrone which comprises reacting, in a ketone which other than ketonic oxygen is entirely saturated aliphatic hydrocarbon, at a temperature of 85 to 200° C., under a pressure of 50 to 3000 atmospheres, acetylene with carbon monoxide in contact with a catalytic amount of a compound selected from the class consisting of halides, carbonyls, and acetyl acetonates of ruthenium and of rhodium.

5. Process for preparing quinonoid compounds of the class consisting of hydroquinone and quinhydrone which comprises reacting, in an ether which other than ether oxygen is entirely saturated aliphatic hydrocarbon, at a temperature of 85 to 200° C., under a pressure of 50 to 3000 atmospheres, acetylene with carbon monoxide in contact with a catalytic amount of a compound selected from the class consisting of halides, carbonyls, and acetyl acetonates of ruthenium and of rhodium.

6. Process for preparing hydroquinone which comprises reacting, in water, at a temperature of 85 to 200° C., under a pressure of 50 to 3000 atmospheres, acetylene with carbon monoxide in contact with a catalytic amount of a compound selected from the class consisting of halides, carbonyls, and acetyl acetonates of ruthenium and of rhodium.

7. Process for preparing hydroquinone which comprises reacting, in water, at a temperature of 85 to 200° C., under a pressure of 50 to 3000 atmospheres, acetylene with carbon monoxide in contact with a catalytic amount of a carbonyl of a metal selected from the class consisting of ruthenium and rhodium.

8. Process for preparing hydroquinone which comprises reacting, in water, at a temperature of 85 to 200° C., under a pressure of 50 to 3000 atmospheres, acetylene with carbon monoxide in contact with a catalytic amount of diruthenium nonacarbonyl.

9. Process for preparing hydroquinone which comprises reacting, in water, at a temperature of 85 to 200° C., under a pressure of 50 to 3000 atmospheres, acetylene with carbon monoxide in contact with a catalytic amount of a chloride of a metal selected from the class consisting of ruthenium and rhodium.

10. Process for preparing hydroquinone which comprises reacting, in an alcohol which other than hydroxyl is entirely saturated aliphatic hydrocarbon, at a temperature of 85 to 200° C., under a pressure of 50 to 3000 atmospheres, acetylene with carbon monoxide in contact with a catalytic amount of a compound selected from the class consisting of halides, carbonyls, and acetyl acetonates of ruthenium and of rhodium.

11. Process for preparing hydroquinone which comprises reacting, in an alkanol, at a temperature of 85 to 200° C., under a pressure of 50 to 3000 atmospheres, acetylene with carbon monoxide in contact with a catalytic amount of a carbonyl of a metal selected from the class consisting of ruthenium and rhodium.

12. Process for preparing hydroquinone which comprises reacting, in a lower alkanol, at a temperature of 85 to 200° C., under a pressure of 50 to 3000 atmospheres, acetylene with carbon monoxide in contact with a catalytic amount of diruthenium nonacarbonyl.

13. Process for preparing hydroquinone which comprises reacting, in an alkanol, at a temperature of 85 to 200° C., under a pressure of 50 to 3000 atmospheres, acetylene with carbon monoxide in contact with a catalytic amount of a chloride of a metal selected from the class consisting of ruthenium and rhodium.

14. Process for preparing hydroquinone which comprises reacting, in water, at a temperature of 85 to 200° C., under a pressure of 50 to 3000 atmospheres, acetylene with carbon monoxide in contact with a catalytic amount of a chelate selected from the class consisting of ruthenium acetyl acetonate and rhodium acetyl acetonate.

References Cited in the file of this patent

UNITED STATES PATENTS 2,702,304    Reppe _____ Feb. 15, 1955

FOREIGN PATENTS 652,655    Germany _____ Nov. 4, 1937

OTHER REFERENCES

Blanchard: Chem. Reviews, vol. 21 (1937), pages 3, 10, 27, 28, 32, 33, 36, 37, 38 (9 pages).

Copenhaver et al.: "Acetylene and Carbon Monoxide Chemistry," pages 292, 293, pub. by Reinhold Pub. Corp., New York (1949).

Reppe: "Acetylene Chemistry," pages 155, 161–63, 192 (5 pages). Translation of P.B. Report 18852–S. Pub. by Charles A. Meyer & Co., Inc., Grand Central Terminal Bldg. (1949).